(12) United States Patent
Hoffmann et al.

(10) Patent No.: US 6,403,664 B1
(45) Date of Patent: Jun. 11, 2002

(54) COMBINATION OF METAL SALTS OF RICINOLEIC ACID WITH REACTIVE AMINES IN PRODUCING POLYURETHANE FORMS

(75) Inventors: Ralf Hoffmann, Senden; Hans-Heinrich Schlöns, Essen, both of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/883,673

(22) Filed: Jun. 18, 2001

(30) Foreign Application Priority Data

Jun. 20, 2000 (DE) .......................................... 100 30 256

(51) Int. Cl.$^7$ .................................................. C08J 9/04
(52) U.S. Cl. .................. 521/129; 521/53; 521/116; 521/118; 521/124; 521/125; 521/126; 521/130; 521/170; 521/174
(58) Field of Search ................................ 521/124, 125, 521/126, 129, 170, 174, 130, 116, 118, 53

(56) References Cited

U.S. PATENT DOCUMENTS

| 5,008,033 A | 4/1991 | Meyer et al. |
| 5,212,209 A | 5/1993 | Weaver et al. |
| 6,194,475 B1 * | 2/2001 | Boinowitz et al. .......... 521/129 |

FOREIGN PATENT DOCUMENTS

| EP | 0 490 342 | 6/1972 |
| WO | WO 96/22182 | 7/1996 |

* cited by examiner

Primary Examiner—John M. Cooney, Jr.
(74) Attorney, Agent, or Firm—Frommer Lawrence & Haug LLP

(57) ABSTRACT

The invention relates to the combined use of metal salts of ricinoleic acid with reactive amines in the preparation of polyurethane foams (PUR foams) and of their solutions in aqueous or organic solvents in the preparation of polyurethane foams in combination with reactive amines.

11 Claims, No Drawings

COMBINATION OF METAL SALTS OF RICINOLEIC ACID WITH REACTIVE AMINES IN PRODUCING POLYURETHANE FORMS

RELATED APPLICATIONS

The application claims priority to German application No. 100 30 256.4, filed on Jun. 20, 2000, herein incorporated by reference.

BACKGROUND OF THE INVENTION

1. Field of the Invention

The invention relates to the combined use of metal salts of ricinoleic acid with reactive amines in the preparation of polyurethane foams (PUR foams).

2. Description of the Related Art

Owing to their outstanding mechanical and physical properties, polyurethane foams are used in a very wide range of areas. A particularly important market for various types of PUR foams, such as conventional ether- and esterpolyol-based flexible foams, cold foams (frequently also referred to as HR foams) and rigid foams, and foams whose properties are between these classifications, such as, for example, semirigid systems, is the automotive industry. For example, rigid foams are used as roof linings, ester foams for interior cladding of the doors and for punched-out sun visors, and cold and flexible foams for seat systems.

In recent years, the requirements set by the automotive manufacturers for their foam suppliers have become substantially more stringent, especially with regard to an emission specification. Whereas in the past attention was focused only on the fogging behavior of the foams (DIN 75 201, determination of the fogging behavior of materials for interior automotive trim), today the content of volatile organic compounds (VOC) is also a subject of analytical determinations (Volkswagen central standard 55 031, Daimler Chrysler PB VWT 709). The Daimler-Chrysler method requires the assignment of the emissions to individual chemical compounds in addition to the quantitative determination of the VOC and fog value.

The prior art involves the use of tin octanoate in the preparation of flexible PUR foams based on polyetherols (George Woods, The ICI Polyurethanes Book, Wiley Publishers, page 45, and Ron Herrington, Flexible Polyurethane Foams, Dow Chemical, page 2.30). The tin octanoate serves as a catalyst in the reaction of isocyanates with polyols (also referred to as a gel catalyst) via a complex transition state. During the preparation of the foam, the tin octanoate hydrolyzes and liberates the 2-ethylhexanoic acid. This decomposition is desired because the back-reaction of the urethane bond to the starting materials is suppressed. The ethyl branching of the octanoate is of decisive importance for the formation of the desired ligand complex.

The use of zinc stearate as an internal lubricant in the preparation of RIM foams reaction injection molding) is widely mentioned in the patent literature. The patents U.S. Pat. No. 5,008,033; U.S. Pat. No. 5,212,209; EP-A 0 490 342 and WO 96/22182 may be mentioned by way of example. The use of metal salts of higher carboxylic acids, preferably zinc stearate, and their additions for compatibilization in the RIM mixture are claimed in these publications.

It should be pointed out here that polyurethane RIM systems have substantial differences compared with the foam systems according to the invention. RIM systems are compact moldings or microcellular systems but by no means open-pore foams. Accordingly, the densities of the two systems differ dramatically. RIM moldings have densities of >700 kg/m$^3$ and the PUR foams according to the invention have densities of <100 kg/m$^3$, in particular <50 kg/m$^3$. The catalysis of RIM systems is substantially different. Instead of tin octanoate, dibutyltin laurate is typically used in RIM systems. As shown by the comparative examples, neither zinc stearate (zinc salt of octadecanoic acid) nor zinc oleate (zinc salt of 9-octadecenoic acid) or zinc 12-hydroxystearate has a substantial advantage.

A conventional flexible foam having the density 25 kg/m$^3$ typically has the following VOC emissions: total value 800 ppm, classified as 550 ppm of BHT (bis-2,6-tert-butyl-4-hydroxytoluene), 200 ppm of 2-ethylhexanoic acid, 20 ppm of tertiary amines, 10 ppm of siloxanes and 20 ppm of unspecified compounds. Of course, the emissions are highly dependent on the respective formulation but BHT and 2-ethylhexanoic acid are always the main components. BHT typically originates from the polyol and isocyanate. The manufacturers of these raw materials have recently been offering BHT-free grades of their products. Using these raw materials, foams having a VOC value of about 250 ppm can be prepared.

Since automotive manufacturers have now specified a VOC guide value of 100 ppm, which is to be reached in the next few years, there is an urgent technical necessity for reducing the 2-ethylhexanoic acid emission and the amine emission.

2-Ethylhexanoic acid is a decomposition product of tin octanoate, which usually acts as a catalyst of the polyurethane reaction. Without an industrially available alternative, which covers this application spectrum, to tin octanoate, it is not possible to reduce the VOC value substantially according to the prior art, and by no means to a value of <100 ppm.

The amine emission from foams constitutes the second problem which at present cannot be satisfactorily solved. There are several possible approaches for reducing the amine emission.

Thus, high molecular weight amines can be used. Owing to the high MW, these compounds are no longer volatile and are not emitted from the foam. At the same time, however, the mobility of the molecules is limited for the same reason, so that the catalytic effect is substantially reduced. Furthermore, the slower curing of the skin constitutes a further problem. The other alternatives are reactive amines which are provided with OH or NH functional reactive structures and are thus incorporated into the PU matrix by reaction. Here too, emission is prevented by the chemical bonding to the polymer. A disadvantage of the compounds available on the market is recatalysis. By lowering the activation barrier, catalysts accelerate not only the forward reaction but also the reverse reaction. Foams which were prepared using reactive amines thus show substantially poorer aging behavior—in particular in the humid aging test.

The prior art describes no possibility for preventing this recatalysis.

It is an object of the present invention to overcome the abovementioned problems.

SUMMARY OF THE INVENTION

In a first embodiment of the invention, the abovementioned problems are solved by using metal salts of ricinoleic acid or their solutions in aqueous or organic solvents for the preparation of polyurethane foams in combination with a reactive amine of the general formula (I)

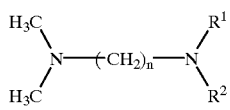 (I)

where
n is 1 to 4,
R$^1$ and R$^2$ are —(CH$_2$—CH$_2$—O)$_x$H,
—(CH$_2$—CH(CH$_3$)—O)$_x$H, or
—(CH$_2$—CH(CH$_2$—CH$_3$)—O)$_x$H,
x is 0, 1, 2, 3 or 4, and
with the proviso that,
at least one of the indices x in the molecule is greater than 0.

By adding the metal salts of ricinoleic acid, it is possible to prepare foam having lower emission values, better flameproof properties and less odor. In addition, the curing of the foam surface is accelerated. These advantages can be achieved without changing the other physical properties, such as, for example, density, hardness, resilience or compressive strength.

DETAILED DESCRIPTION OF THE INVENTION

Ricinoleates of the metals of the 1st, 2nd or 4th main group and of the 1st, 2nd or 8th subgroup of the Periodic Table are particularly suitable. Particularly preferred in the context of the present invention are zinc and/or tin, so that tin-free foams can also be prepared.

Among the cations, tin is particularly preferred, especially in the divalent form, since tin ricinoleate is present in liquid form at room temperature. The likewise preferred zinc salt of ricinoleic acid can be predissolved in the activator solution, consisting of water, tertiary amine, silicone stabilizer and optionally emulsifier. The direct metering of the solid ricinoleate into the foaming component leads to a foam having an irregular cell structure. Since many expanders have only direct metering, a product in which the zinc salt of ricinoleic acid is present in dissolved form, or the tin salt in liquid form, constitutes a considerable improvement. Anhydrous solutions are preferable because otherwise the water from the solvent reacts with the isocyanates and therefore has to be included in the calculations for the formulation. Moreover, some transition metal salts have only limited stability to hydrolysis.

In principle, the combinations of from about 5 to about 50% by weight, based on the mass of solvents and salt, of an ethoxylated fatty alcohol having a straight and branched alkyl chain and between 10 and 18 carbon atoms and less than 30 ethylene oxide units with from about 5 to about 30% by weight of a tertiary amine are suitable as anhydrous solvents for the zinc salt of ricinoleic acid. In solvents characterized in this manner, up to about 60% by weight of the metal salt of ricinoleic acid can be dissolved to give a clear solution.

A combination of from 5 to 32% by weight of a fatty alcohol having a straight and branched alkyl chain and between 10 and 18 carbon atoms and less than 20 ethylene oxide units with from 5 to 30% by weight of the reactive amine is preferred.

Such a solution is described, for example, in DE-A-40 14 055 as a composition having a deodorizing effect. Cosmetics, washing and cleaning and odor absorption in industrial applications are described as applications. The use, according to the invention, in the PUR foam differs from these applications in three fundamental aspects.

Firstly, the zinc salt of ricinoleic acid is exposed to very reactive reactants, such as isocyanate, in the preparation of PUR foams. A person skilled in the art expects a reaction with the hydroxyl function of the ricinoleate and hence incorporation into the polymer matrix. Secondly, the effects of the zinc ricinoleate on the carefully tailored catalysis of the PUR foam and hence the possibility of preparing a physically identical foam are not foreseeable. An effect on the catalysis by the amino alcohol, which serves as a solvent component, is likewise not foreseeable. Thirdly, the substance 2-ethylhexanoic acid to be bound is formed from the tin octanoate only during the foam preparation. This means that, within the short PUR reaction, which typically takes about 100 seconds, all transport processes which relate to contact between the reactants 2-ethylhexanoic acid and metal salt of ricinoleic acid have to be complete before the polymer matrix solidifies.

A preferred embodiment of the present invention comprises the use of a specific tin catalyst in combination with reactive amine. The tin catalyst has a greater tendency to catalyze the so-called gel reaction (urethane formation) in the preparation process for PU foam. The amine catalyst, optionally in combination with further amines, is on the other hand more responsible for accelerating the blowing reaction (finally urea formation). In systems of the prior art, a a mixture of the two catalysts is used which leads to a useful balance between the two partial reactions. It is possible to reduce the amine emission, for example, not only by the use of less amine catalyst, since the two partial reactions run out of equilibrium as a result. This is also true for the use of tin catalysts for the gel reaction.

The combination according to the invention has the following advantages: the metal salt catalyst contains no readily volatile acid, similarly to the case of tin octanoate. The acid used has a substantially higher MW than 2-ethylhexanoic acid. In addition, the acid also carries a reactive OH functionality, as a result of which the molecule is incorporated into the polymer matrix and can no longer be emitted.

A further substantial advantage is the surprisingly substantially altered balance between the catalysis of the two partial reactions. Owing to the increased acceleration of the blowing reaction, the amount of amine catalyst to be used can be substantially reduced compared with the prior art. With the use of a reactive amine having two reactive centers, the tendency to emission is completely suppressed. Particularly surprising is the effect that, as a result of the combination of said catalysts, no deterioration with regard to humid aging was observed. The foams prepared using this combination do not differ with regard to their aging properties from present-day foams produced using tin octanoate and volatile amines.

In the context of the present invention, the reactive amines in combination with metal salts of ricinoleic acid or their solutions in aqueous or organic solvents, which can be used in the preparation of polyurethane foam, are particularly preferably selected so that n in the general formula (I) is 3. In the context of the present invention, it is also particularly preferred if x in the general formula (I) is 1 and y is likewise 1.

In the context of the present invention, the reactive amine used is particularly preferably an N,N-dimethy-N',N'-2-hydroxy(propyl)-1,3-propylenediamine.

The reaction

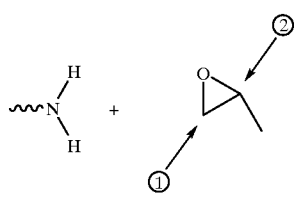

takes place mainly on the sterically less hindered side of the alkylene oxide (to an extent of about 90%). There is also always a reaction product which is formed by attack at "2" (to an extent of about 10%).

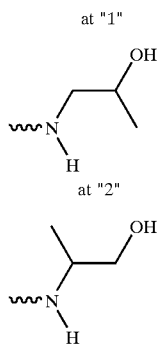

EXAMPLES

Preparation of the Polyurethane Foams 300 g of polyol were used in the foaming; the other formulation components were converted accordingly. For example, 1.0 part of a component denoted 1 g of this substance per 100 g of polyol.

For the foaming, the polyol, water, amine, the tin compound and silicone stabilizer were thoroughly mixed while stirring. After the addition of the isocyanate, stirring was carried out with a stirrer for 7 seconds at 3000 rpm and the mixture was poured into a wooden box (base area 27 cm×27 cm) lined with paper. A foam formed and was subjected to the performance tests described below.

Performance Tests

Physical Properties of the Foams

The foams prepared were assessed on the basis of the following physical properties:
a) Sagging of the foam after the end of the rise phase (=sinking)
b) Foam height
c) Density (D)
d) The air permeability of the foam was determined by a dynamic pressure measurement on the foam. The measured dynamic pressure was stated in mm water column, the lower dynamic pressure value then characterizing the more open foam. The values were measured in the range from 0 to 300 mm.
e) Compressive strength CLD, 40%
f) Compression set under compression by 90% for 22 h at 70° C.
g) Resilience (ball rebound test)

Measurement of the Emissions

The 2-ethylhexanoic acid emission was determined on the basis of the Daimler-Chrysler test method PB VWT 709.

The procedure for the thermal desorption with subsequent coupled gas chromatography/mass spectrometry (GC/MS) is described below.

a) Measurement Technique:

The thermal desorption was carried out using a "TDS2" thermal desorber with sample changer from Gerstel, Mülheim, in combination with a Hewlett Packard HP6890/HP5973 GC/MSD system.

b) Measurement Conditions:

TABLE 1

| | |
|---|---|
| Thermal desorption | Gerstel TDS 2 |
| Desorption temperature | 90° C. |
| Desorption time | 30 min |
| Flow rate | 60 ml/min |
| Transfer line | 280° C. |
| Cryofocusing | HP 6890 PTV |
| Liner | Glass evaporator tube with silanized glass wool |
| Temperature | −150° C. |
| GC | Capillary GC HP 6890 |
| Injector | PTV Split 1:50 |
| Temperature program | −150° C.; 3 min; ⇒ 720° C./min; 280° C. |
| Column | 60 m * 0.25 mm Optima 5 MS dF 0.5 μm |
| Flow rate | 1 ml/min const. flow |
| Temperature program | 50° C.; 5 min; ⇒ 3° C./min; 92° C.; ⇒ 5° C./min; 160° C.; ⇒ 10° C./min; 280° C.; 20 min |
| Detector | HP MSD 5973 |
| Mode | Scan 29-350 amu 2.3 scans/sec |
| Evaluation | Evaluation of the total ion current chromatogram by calculation as toluene equivalent | c) Calibration

For the calibration, 1 μl of a mixture of toluene and hexadecane in pentane (0.6 mg/ml each) was added to a cleaned adsorption tube filled with Tenax® TA (mesh 35/60) and measured (desorption 5 min; 280° C.).

d) Sample Preparation 10 mg of foam in three samples were introduced into a thermal desorption tube. It was ensured that the foam was not compressed.

In two formulations based on 3.0 and 5.0 parts of water, the different behavior of tin octanoate and tin ricinoleate were compared with one another. It was intended to attempt to simulate the rise time given by tin octanoate by the exclusive use of tin ricinoleate. This was realized both without amine reduction and, in a further step, with retention of the corresponding rise time and amine reduction with simultaneous increase in tin ricinoleate.

Foaming Results

Example 1

100 parts of polyol, Voranol® CP 3322 (Dow Chemical)
5.0 parts of water
0.80 part of foam stabilizer, TEGOSTAB® BF 2370 (Goldschmidt)
58.4 parts of isocyanate (tolylene diisocyanate T80)
(80% of 2,4-isomer, 20% of 2,6-isomer)
The table below shows the type of catalyst and the foaming result.

TABLE 2

| Tin catalyst | Amine catalyst | Rise time[s] | Density [kg/m³] | Porosity* | Compressive strength CLD 40 Compression [kPa] |
|---|---|---|---|---|---|
| 0.18 part of KOSMOS ® 29** | 0.15 part of PE4360*** | 93 | 20.7 | 18 | 3.2 |
| 0.24 part of KOSMOS ® 29** | 0.15 part of PE4360*** | 83 | 20.2 | 52 | 3.7 |
| 0.30 part of KOSMOS ® 29** | 0.15 part of PE4360*** | 74 | 19.7 | >179 | 4.1 |
| 0.36 part of tin ricinoleate | 0.15 part of PE4360*** | 96 | 20.5 | 11 | 2.7 |
| 0.48 part of tin ricinoleate | 0.15 part of PE4360*** | 82 | 20.1 | 12 | 3.1 |
| 0.60 part of tin ricinoleate | 0.15 part of PE4360*** | 73 | 20.0 | 15 | 3.2 |
| 0.40 part of tin ricinoleate | 0.05 part of PE4360*** | 96 | 20.4 | 9 | 3.2 |
| 0.53 part of tin ricinoleate | 0.05 part of PE4360*** | 83 | 20.2 | 14 | 3.5 |
| 0.66 part of tin ricinoleate | 0.05 part of PE4360*** | 75 | 19.7 | >132 | 3.9 |

*Air permeability is stated in mm dynamic pressure (water column), which builds up if a constant air stream is passed through the foam. The higher the state value, the more closed-cell is the foam, and vice versa.
**(Tin octanoate)
***(N,N-dimethyl-N',N'-2-hydroxy(propyl)-1,3-propylenediamine)

Using 5.0 parts of water formulation, it was clear that, with a 100% increase in the amount of tin ricinoleate, comparable rise times were obtained in comparison with tin octanoate with retention of the amine concentration. While density, tensile strength, elongation at break, compression set and resilience could be regarded as substantially comparable taking into account the general variations and the fact that the foams were in some cases too closed, considerable differences were found in the porosity and the compressive strength. Tin ricinoleate in relatively high concentrations led to a less closed-cell character than tin octanoate. The more flexible foams obtained using tin ricinoleate emphasize the poorer potential for catalyzing the urethane reaction.

In a further step, the amine concentration was reduced from 0.15 to 0.05 part and the content of tin ricinoleate which gave a rise time comparable with the experiments carried out above was determined. A farther increase of 20%, i.e. altogether 120% above the concentration of tin octanoate, once again led to comparable rise times. Physical properties comparable in all respects could now be obtained with tin octanoate and tin ricinoleate.

Example 2

| Formulation |
|---|
| 100 parts of polyol, Voranol ® CP 3322 (Dow Chemical) |
| 3.0 parts of water |
| 0.6 part of foam stabilizer, TEGOSTAB ® BF 2370 (Goldschmidt) |
| 38.1 parts of isocyanate (tolylene diisocyanate T80) (80% of 2,4-isomer, 20% of 2,6-isomer) |

TABLE 3

| Tin catalyst | Tensile strength [kPa] | Elongation at break [%] | Compression set 90%, 22 h, 70° C. [%] | Resilience [%] |
|---|---|---|---|---|
| 0.18 part of KOSMOS ® 29** | 96 | 137 | 9 | 42 |
| 0.24 part of KOSMOS ® 29** | 118 | 199 | 48 | 35 |
| 0.30 part of KOSMOS ® 29** | 115 | 187 | >85 | 23 |
| 0.36 part of tin ricinoleate | 107 | 202 | 8 | 44 |
| 0.48 part of tin ricinoleate | 106 | 206 | 9 | 39 |
| 0.60 part of tin ricinoleate | 114 | 206 | 52 | 37 |
| 0.40 part of tin ricinoleate | 105 | 189 | 9 | 41 |
| 0.53 part of tin ricinoleate | 119 | 213 | 45 | 37 |
| 0.66 part of tin ricinoleate | 117 | 206 | >85 | 19 |

**see table 2

TABLE 4

| Tin catalyst | Amine catalyst | Rise time[s] | Density [kg/m³] | Porosity* | Compressive strength CLD 40 Compression [kPa] |
|---|---|---|---|---|---|
| 0.15 part of KOSMOS ® 29** | 0.25 part of PE4360*** | 167 | 31.4 | 14 | 3.3 |
| 0.21 part of KOSMOS ® 29** | 0.25 part of PE4360*** | 136 | 31.1 | 52 | 4.1 |
| 0.27 part of KOSMOS ® 29** | 0.25 part of PE4360*** | 129 | 30.4 | >300 | 4.5 |
| 0.30 part of tin ricinoleate | 0.25 part of PE4360*** | 167 | 32.2 | 11 | 3.2 |
| 0.45 part of tin ricinoleate | 0.25 part of PE4360*** | 137 | 31.0 | 25 | 3.2 |
| 0.50 part of tin ricinoleate | 0.25 part of PE4360*** | 127 | 30.6 | 28 | 3.6 |
| 0.38 part of tin ricinoleate | 0.10 part of PE4360*** | 168 | 32.1 | 20 | 3.5 |
| 0.48 part of tin ricinoleate | 0.10 part of PE4360*** | 134 | 31.1 | 36 | 3.9 |
| 0.55 part of tin ricinoleate | 0.10 part of PE4360*** | 127 | 30.9 | 53 | 4.0 |

*Air permeability is stated in mm dynamic pressure (water column), which builds up if a constant air stream is passed through the foam. The higher the state value, the more closed-cell is the foam, and vice versa.
**(Tin octanoate)
***(N,N-dimethyl-N',N'-2-hydroxy(propyl)-1,3-propylenediamine)

TABLE 5

| Tin catalyst | Tensile strength [kPa] | Elongation at break [%] | Compression set 90%, 22 h, 70° C. [%] | Resilience [%] |
|---|---|---|---|---|
| 0.15 part of KOSMOS ® 29** | 99 | 175 | 6 | 49 |
| 0.21 part of KOSMOS ® 29** | 106 | 183 | 7 | 48 |
| 0.27 part of KOSMOS ® 29** | 99 | 163 | 21 | 36 |
| 0.30 part of tin ricinoleate | 64 | 117 | 6 | 48 |
| 0.45 part of tin ricinoleate | 95 | 191 | 6 | 48 |
| 0.50 part of tin ricinoleate | 89 | 180 | 5 | 48 |
| 0.38 part of tin ricinoleate | 86 | 166 | 5 | 49 |
| 0.48 part of tin ricinoleate | 93 | 174 | 4 | 48 |
| 0.55 part of tin ricinoleate | 95 | 180 | 4 | 47 |

**see table 4

As in the case of the 5.0 parts of water formulation, an attempt was likewise made on the basis of 3.0 parts of water formulation to achieve rise times comparable with tin octanoate. With slightly larger differences and with the use of a larger amount of tin ricinoleate (in this case 100±15% or 125±25 % with amine reduction) it was possible to achieve rise times comparable with tin octanoate. The total property profile of these foams corresponded in every respect to those from the 5.0 parts of water formulation. The lower crosslinking activity is represented in the case of these foams by side splits in the lower concentration range of tin ricinoleate. With an amine reduction from 0.25 to 0.10 (a further reduction is certainly not appropriate here), satisfactory foam results are obtained from 0.48 part of tin ricinoleate.

TABLE 6

| Stochiometric considerations | | |
|---|---|---|
| | Tin octanoate | Tin ricinoleate |
| Molecular weight$_{Acid}$ | 144.2 | 298.45 |
| Molecular weight$_{Tin\ salt}$ | 405.1 | 713.6 |
| % of tin$^{++}$ | 29.3 | 16.6 |

This led to a factor of 1.76 between these two products. In other words, to introduce a comparable amount of tin$^{++}$ into the formulation, it was necessary to use 1.76 times the amount of tin ricinoleate compared with tin octanoate. Owing to the shift between driving reaction and gel reaction, however, this amount was not sufficient. Depending on the formulation and initially taken amount of tin octanoate, the application factor was between 1.85 and 2.15. If a part of the amine was compensated by tin ricinoleate, the factor increased to 2.2 to 2.5. Tin ricinoleate was compared with tin octanoate. It is clear that, in the case of tin ricinoleate, the ratio between blowing catalytic and gel catalytic properties is substantially shifted toward the blowing catalysis compared with tin octanoate. This property profile can be compensated by reducing the corresponding amine concentration.

Example 3

The propoxylated DMAPA (PE 4360) characterized with a positive property profile in preliminary experiments was to be tested with regard to its behavior in forcing recatalytic processes and was to be compared with other products. A particularly critical formulation of higher density was chosen for this purpose, the concentration in which all tested amines were used being kept constant at 0.25 part. In addition, an anhydrous liquid formulation of zinc ricinoleate dissolved in an ethoxylated fatty alcohol and a tertiary amine was included in the investigation. The two tables below provide information about both the different catalytic behaviors of the selected products and the physical foam properties, measured both before and after thermal and hydrolytic aging.

| Formulation | |
|---|---|
| 100 | parts of polyol, Voranol ® CP 3322 (Dow Chemical) |
| 2.4 | parts of water |
| 1.0 | part of foam stabilizer, TEGOSTAB ® B 8002 (Goldschmidt) |
| 0.18 | part of tin octanoate, KOSMOS ® 29 |
| 0.25 | part of amine catalyst, N,N-dimethyl-N',N'-2-hydroxy(propyl)-1,3-propylenediamine |
| 32.0 | parts of isocyanate (tolylene diisocyanate T80) (80% of 2,4-isomer, 20% of 2,6-isomer) |

TABLE 7

| Amine catalyst | Rise time[s] | Density [kg/cm$^3$] | Porosity* | CLD, 40% compression [kPa] (without pretreatment) | CLD, 40% compression [kPa] after 5 h, 120° C., 100% rel. h. | CLD, 40% compression [kPa] after 2 h, 180° C. | CLD, 40 % compression [kPa] after 2 h, 200° C. |
|---|---|---|---|---|---|---|---|
| TEGOAMIN ® DMEA[1] | 194 | 39.6 | 13 | 3.8 | 3.5 | 2.6 | 3.2 |
| TEGOAMIN ® B 75[2] | 141 | 38.6 | 13 | 3.4 | 2.9 | 2.6 | 2.9 |
| 3) | 176 | 38.4 | 14 | 3.1 | 2.7 | totally destroyed | totally destroyed |
| PE 4360[4] | 202 | 40.0 | 60 | 3.7 | 3.2 | 2.8 | 3.0 |
| TEGOAMIN ® DMEE[5] | 177 | 38.8 | 11 | 3.2 | 2.9 | totally destroyed | totally destroyed |
| 6) | 144 | 38.4 | 9 | 3.2 | 2.8 | 2.3 | totally destroyed |
| API[7] | 149 | 39.6 | 31 | 3.7 | 3.3 | 2.5 | 2.0 |

[1])Tegoamin ® DMEA = Dimethylethanolamine
[2])Tegoamin ® B75 = Standard catalyst (mixture of different amines)
3) = N,N-Dimethylaminoethyl-N,N-methylethanolamine
[4])PE 4360 N,N-dimethyl-N',N'-2-hydroxy(propyl)-1,3-propylendiamine
[5])Tegoamin ® DMEE = Dimethylaminoethoxyethanol
6) = N,N-bis(3-dimethylaminopropyl)-N-isopropanolamine
[7])API = Aminopropylimidazole
*Air permeability stated in mm dynamic (water column), which is built up if a constant air stream is passed through the foam.
The higher the stated value, the more closed-cell is the foam, and vice versa.

TABLE 8

| | Compression set 22 h, 90% compression, 70° C. [%] | | | |
|---|---|---|---|---|
| Amine catalyst | without pretreatment | after 5 h, 120° C., 100% rel.h. | after 2 h, 180° C. | after 2 h, 200° C. |
| TEGOAMIN ® DMEA[1] | 3 | 6 | 16 | 5 |
| TEGOAMIN ® B 75[2] | 3 | 6 | 5 | |
| 3) | >85 | 27 | totally destroyed | totally destroyed |
| PE 4360[4] | 4 | 7 | 8.0 | 5.0 |
| TEGOAMIN ® DMEE[5] | 4 | 6 | totally destroyed | totally destroyed |
| 6) | 4 | 6 | 12 | totally destroyed |
| API[7] | 4 | 7 | 6 | 7 |

[1]–[7])see table 7

The compressive strength, measured at 40% compression, which was represented by the four columns after the porosity, showed that thermal aging here in the range between 180 and 200° C. influences the recatalysis to a greater extent than hydrolytic aging for 5 hours at 120° C. at 100% relative humidity. As expected, foams based on the amine 3) and DMEE were totally destroyed under the action of heat. Amine 6), too, was actively involved in the recatalytic process, at least at a temperature of 200° C. Aminopropylimidazole (API) could not be unambiguously assigned, but in the case of this product there was doubt as to whether it too did not have an effect on the change in the compressive strength under extreme conditions.

TEGOAMIN® DMEA, TEGOAMIN® B 75 and PE 4360 show absolutely comparable values. This means that all three products contributed to a smaller extent, but comparably, to the recatalysis of the corresponding foams.

On considering the compression set, property profiles comparable with the compressive strength were found. However, amine 3) was striking here, simply because of its destructive property in the determination of the compression set without thermal aging. The property profile of PE 4360, which did not differ in any form from DMEA and B 75, was once again gratifying.

The next table shows the property profile of foams which were prepared using the formulation of zinc ricinoleate with a correspondingly reduced KOSMOS® 29 content.

| Formulation | |
|---|---|
| 100 | parts of polyol, Voranol ® CP 3322 (Dow Chemical) |
| 2.4 | parts of water |
| 1.0 | part of foam stabilizer, TEGOSTAB ® B 8002 (Goldschmidt) |
| 0.12 | part of tin octanoate, KOSMOS ® 29 |
| 0.25 | part of amine catalyst, N,N-dimethyl-N',N'-2-hydroxy(propyl)-1,3-propylenediamine |
| 32.0 | parts of isocyanate, (tolylene diisocyanate T80) (80% of 2,4-isomer, 20% of 2,6-isomer) |
| 1.0 | part of zinc ricinoleate formulation (50% by weight of Zn salt) |

TABLE 9

| Amine catalyst | Rise time[s] | Density [kg/cm$^3$] | Porosity* | CLD, 40% compression [kPa] (without pretreatment) | CLD, 40% compression [kPa] after 5 h, 120° C., 100% rel. h. | CLD, 40% compression [kPa] after 2 h, 180° C. | CLD, 40 % compression [kPa] after 2 h, 200° C. |
|---|---|---|---|---|---|---|---|
| TEGOAMIN ® DMEA[1] | 204 | 40.4 | 21 | 3.7 | 3.2 | 1.9 | totally destroyed |
| TEGOAMIN ® B 75[2] | 147 | 37.8 | 138 | 3.4 | 2.9 | 1.9 | totally destroyed |
| 3) | 157 | 37.2 | 15 | 3.0 | 2.2 | totally destroyed | totally destroyed |
| PE 4360[4] | 217 | 39.0 | 90 | 3.4 | 3.1 | 1.5 | totally destroyed |
| TEGOAMIN ® DMEE[5] | 179 | 38.8 | 21 | 3.3 | 2.9 | totally destroyed | totally destroyed |

TABLE 9-continued

| Amine catalyst | Rise time[s] | Density [kg/cm³] | Porosity* | CLD, 40% compression [kPa] (without pretreatment) | CLD, 40% compression [kPa] after 5 h, 120° C., 100% rel. h. | CLD, 40% compression [kPa] after 2 h, 180° C. | CLD, 40 % compression [kPa] after 2 h, 200° C. |
|---|---|---|---|---|---|---|---|
| 6) | 146 | 36.8 | 21 | 2.9 | 2.4 | 1.2 | totally destroyed |
| API[7] | 189 | 39.2 | 107 | 3.2 | 2.5 | totally destroyed | totally destroyed |

[1]–[7]see table 7
*Air permeability is stated in mm dynamic pressure (water column), which builds up if a constant air stream is passed through the foam. The higher the stated value, the more closed-cell is the foam, and vice versa.

TABLE 10

| | Compression set 22 h, 90% compression, 70° C. [%] | | | |
|---|---|---|---|---|
| Amine catalyst | without pretreatment | after 5 h, 120° C., 100% rel.h. | after 2 h, 180° C. | after 2 h, 200° C. |
| TEGOAMIN ® DMEA[1] | 4 | 6 | 6 | totally destroyed |
| TEGOAMIN ® B 75[2] | 5 | 7 | 10 | totally destroyed |
| 3) | 8 | 11 | totally destroyed | totally destroyed |
| PE 4360 4) | 9 | 9 | 12 | totally destroyed |
| TEGOAMIN ® DMEE[5] | 5 | 8 | totally destroyed | totally destroyed |
| 6) | 6 | 7 | 30 | totally destroyed |
| API[7] | 6 | 8 | totally destroyed | totally destroyed |

[1]–[7]see table 7

It was found that foams cocatalyzed with zinc ricinoleate are more sensitive to recatalysis when higher temperatures are used. Thus, after exposure for 2 hours at 200° C., all foams prepared here were totally destroyed. On reducing the temperature from 200° C. to 180° C., amine 3), DMEE and interestingly also aminopropylimidazole are eliminated from consideration while foams prepared using amine 6) also decline greatly in quality. The behavior of PE 4360, which did not differ in its property profile substantially from DMEA and B 75, was once again to be rated positively.

The emission behavior of the foams described above was determined according to the Daimler-Chrysler test instruction BP VWT 709 VOC determination (30 min at 90° C.). The following results were obtained:

When zinc ricinoleate was used, the average 2-ethylhexanoic acid emission decreased to 25%. However, it was also clear that the emission increased substantially with the use of the nonreactive amine TEGOAMIN® B 75 and TEGOAMIN® DMEA.

Propoxylated DMAPA (PE 4360) was compared with other amine catalysts. With the use of hydrolysis and elevated temperature, a test was carried out to determine the extent to which different catalysts control the recatalysis.

All foams were in principle adversely affected in their physical properties by the thermal or hydrolytic stress. It must be made quite clear that this property profile could not be consistently ascribed to the amines. Thus, it was entirely possible that a foam mist have suffered such a deterioration in the physical foam properties also without any use of an amine.

It may be regarded as certain that, with its property profile, PE 4360 influenced the recatalysis of foams produced with this product, in a manner comparable with DMEA and B 75.

In the case of products such as amine 3) and DMEE, a substantial disintegration of the foams produced therewith was to be expected. Somewhere in the middle were amine 6) and possibly also API, whose foams produced therewith are also adversely affected in their physical properties under more stringent aging conditions.

On the basis of the investigations carried out here PE 4360 could be regarded as a suitable catalyst for emission-free foams.

Example 4

The following examples clearly show that satisfactory foams having unexpectedly good aging behavior are prepared using tin ricinoleate and PE 4360.

TABLE 11

| | without zinc ricinoleate | | | with zinc ricinoleate | | |
|---|---|---|---|---|---|---|
| | 2-Ethyl-hexanoic acid [μg/g] | Amine [μg/g] | Total emission [μg] | 2-Ethyl-hexanoic acid [μg/g] | Amine [μg/g] | Total emission [μg] |
| TEGOAMIN ® DMEA[1] | 519 | — | 560 | 146 | 108 | 300 |
| TEGOAMIN ® B 75[2] | 595 | 166 | 1001 | 163 | 481 | 688 |
| 3) | 58 | — | 102 | 46 | — | 91 |
| PE 4360[4] | 423 | — | 467 | 87 | — | 133 |
| TEGOAMIN ® DMEE[5] | 438 | — | 490 | 113 | — | 184 |
| 6) | 480 | — | 528 | 132 | — | 175 |
| API[7] | 512 | — | 568 | 74 | — | 115 |

[1]–[7]see table 7

| Formulation 1: | |
|---|---|
| 100 | parts of polyol, Voranol ® CP 3322 (Dow Chemical) |
| 2.4 | parts of water |
| 1.0 | parts of foam stabilizer, TEGOSTAB ® B 8002 (Goldschmidt) |
| 0.42 | part of tin ricinoleate |
| 0.25 | part of N,N-dimethyl-N',N'-2-hydroxy(propyl)-1,3-propylenediamine PE 4360 |
| 32.0 | part of isocyanate (tolylene diisocyanate T80) (80% of 2,4-isomer, 20% of 2,6-isomer) |

TABLE 12

| | | | | | | after hydrolytic aging 5 h 120° C. | | after hydrolytic aging 2 h 180° C. | |
|---|---|---|---|---|---|---|---|---|---|
| Rise time[s] | Height [cm] | Sag [cm] | Density [kg/m³] | Poros- ity* | CLD 40% compr. [kPa] | Compression set 22 h 70° C., 90% compr. [%] | CLD 40% compr. [kPa] | Compression set 22 h 70° C., 90% compr. [%] | CLD 40% compr. [kPa] | Compression set 22 h 70° C., 90% compr. [%] |
| 187 | 22.4 | −0.30 | 37.8 | 14 | 3.3 | 3 | 2.6 | 4 | 2.6 | 5 |

*Air permeability is stated in mm dynamic pressure (water column), which is built up if a constant air stream is passed through the foam. The higher the stated value, the more closed-cell is the foam, and vice versa.

| Formulation 2: | |
|---|---|
| 100 | parts of polyol, Voranol ® CP 3322 (Dow Chemical) |
| 5.0 | parts of water |
| 1.0 | parts of foam stabilizer, TEGOSTAB ® B 8002 (Goldschmidt) |
| 0.44 | part of tin ricinoleate |
| 0.25 | part of N,N-dimethyl-N',N'-2-hydroxy(propyl)-1,3-propylenediamine PE 4360 |
| 32.0 | parts of isocyanate (tolylene diisocyanate T80) (80% of 2,4-isomer, 20% of 2,6-isomer) |

TABLE 13

| | | | | | | after hydrolytic aging 5 h 120° C. | | after hydrolytic aging 2 h 180° C. | |
|---|---|---|---|---|---|---|---|---|---|
| Rise time[s] | Height [cm] | Sag [cm] | Density [kg/m³] | Poros- ity* | CLD 40% compr. [kPa] | Compression set 22 h 70° C., 90% compr. [%] | CLD 40% compr. [kPa] | Compression set 22 h 70° C., 90% compr. [%] | CLD 40% compr. [kPa] | Compression set 22 h 70° C., 90% compr. [%] |
| 81 | 27.0 | −0.10 | 20.7 | 9 | 3.1 | 9 | 2.5 | 8 | 2.9 | 9 |

*Air permeability is stated in mm dynamic pressure (water column), which is built up if a constant air stream is passed through the foam. The higher the stated value, the more closed-cell is the foam, and vice versa.

The above description of the invention is intended to be illustrative and not limiting. Various changes and modification in the embodiments described above may occur to those skilled in the art. These changes can be made without departing from the scope and spirit of the invention.

What is claimed is:

1. A process for preparing a polyurethane foam which comprises reacting a mixture comprising polyurethane precursors in the presence of a catalyst comprising at least one metal salt of ricinoleic acid or a solution of said salt in an aqueous or organic solvent and a reactive amine of the formula

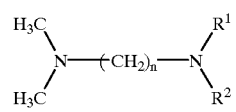

(I)

where
n is 1 to 4,
$R^1$ and $R^2$ are $(CH_2-CH_2-O)_xH$, $(CH_2-CH(CH_3)-O)_xH$, or $(CH_2-CH(CH_2-CH_3)-O)_xH$, and,
x is 0, 1, 2, 3 or 4, with the proviso that,
at least one of the indicies x in the molecule is greater than 0.

2. The process as claimed in claim 1, wherein the salt is a salt of metal from the $1^{st}$, $2^{nd}$, or $4^{th}$ main group of the Periodic Table.

3. The process as claimed in claim 1, wherein the salt is a salt from the $1^{st}$, $2^{nd}$ or $8^{th}$ subgroup of the Periodic Table.

4. The process as claimed in claim 1, wherein the metal in the metal salt of ricinoleic acid is zinc or tin.

5. The process as claimed in claim 1, wherein n in formula (I) is 3.

6. The process as claimed in claim 1, wherein x in formula (I) is 1.

7. The process as claimed in claim 1, wherein the reactive amine is N,N-dimethyl-N',N'-2-hydroxy(propyl)-1,3-propylenediamine.

8. The process according to claim 1, wherein the mixture comprises from about 5 to about 50% by weight, based upon solvent and salt, of an ethoxylated fatty alcohol having a straight or branched alkyl chain, which has from 10 and 18 carbon atoms and less than 30 ethylene oxide units, and from about 5 to about 30% by weight, based upon solvent and salt, of a tertiary amine.

9. The process according to claim 4, wherein the metal is zinc and the zinc is salt ricinoleic acid is predisolved in an activator solution comprising water, a tertiary amine and a silicone stablizer and optionally an emulsifier.

10. The process according to claim 1, wherein the reaction is anlydrous.

11. A polyurethane foam obtained by the process according to claim 1.

* * * * *